United States Patent [19]
Evans

[11] Patent Number: 5,819,584
[45] Date of Patent: Oct. 13, 1998

[54] LINEAR DRIVE SYSTEM

[76] Inventor: Daryl L. Evans, 385 Pine Shadow, Vidor, Tex. 77662

[21] Appl. No.: 832,499

[22] Filed: Apr. 3, 1997

[51] Int. Cl.⁶ .................................................. F16H 27/02
[52] U.S. Cl. .......................................... 74/89.21; 474/140
[58] Field of Search ................................. 474/111, 139, 474/140, 150; 74/89, 89.2, 89.21

[56] References Cited

U.S. PATENT DOCUMENTS

| | | | |
|---|---|---|---|
| 3,973,893 | 8/1976 | Camp, III | 474/324 R |
| 5,517,872 | 5/1996 | Anada | 74/89.21 |
| 5,564,309 | 10/1996 | Nakamura et al. | 74/89.21 |
| 5,690,567 | 11/1997 | DeNijs et al. | 474/73 |

*Primary Examiner*—Charles A. Marmor
*Assistant Examiner*—David M. Fenstermacher
*Attorney, Agent, or Firm*—Jo Katherine D'Ambrosio

[57] ABSTRACT

A linear support system for translating rotary motion into linear motion that reduces backlash and stretch in a belt driven by a drive motor by providing at least two pressure pads on either side of a drive carriage. The toothed belt is press-fitted onto a toothed rack by the pressure pads. The rack is machined to match the grooves and teeth of the belt. A tensioning roller within the drive carriage is used to tension the belt. The multiple teeth of the belt are tensioned against the multiple teeth of the rack as the belt passes between the pressure pad and the rack resulting in even tensile load distribution thereby reducing belt stress and strain. The section of the belt under tension is confined to the area between two pressure pads. In robotics applications the linear drive system is provided with support members to perform payload displacement functions.

18 Claims, 5 Drawing Sheets

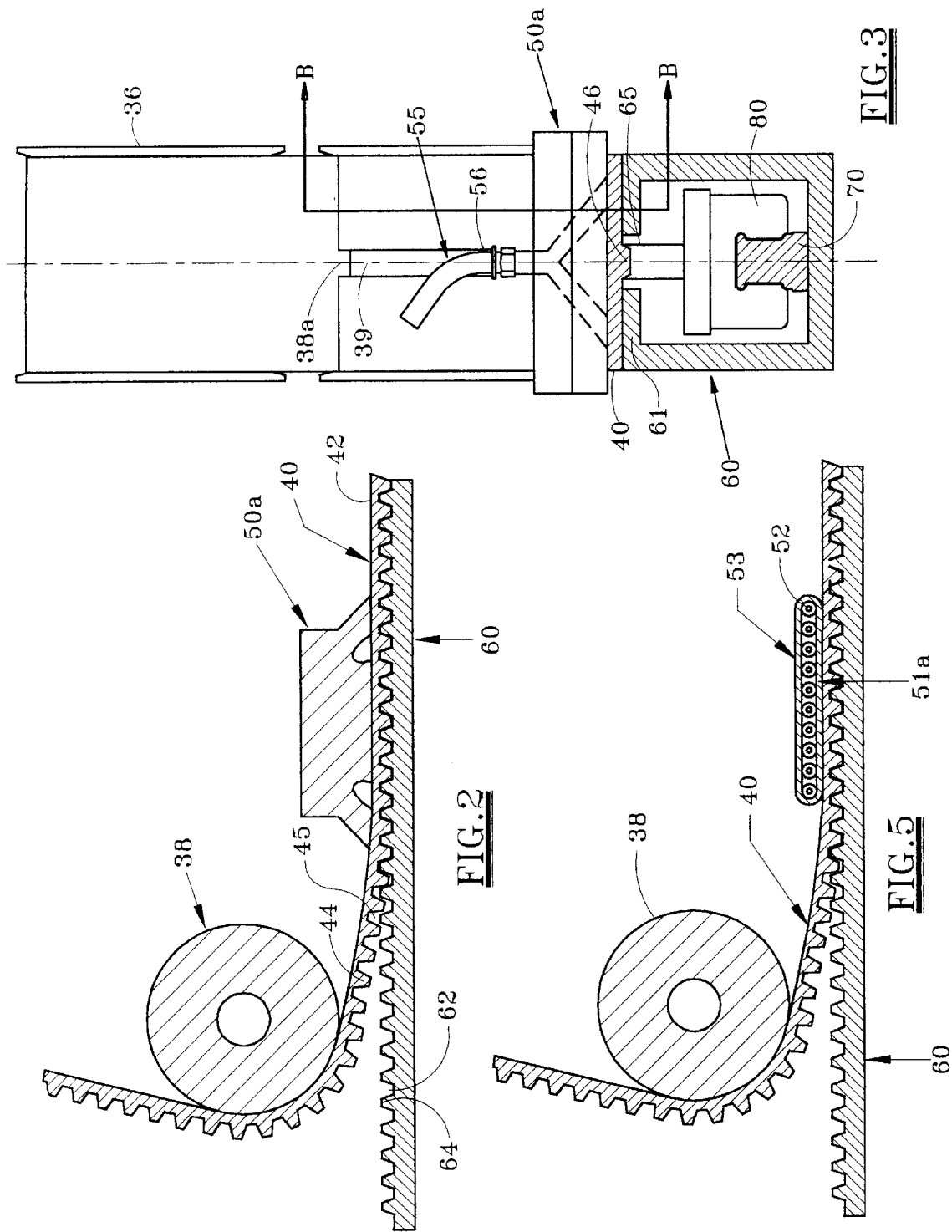

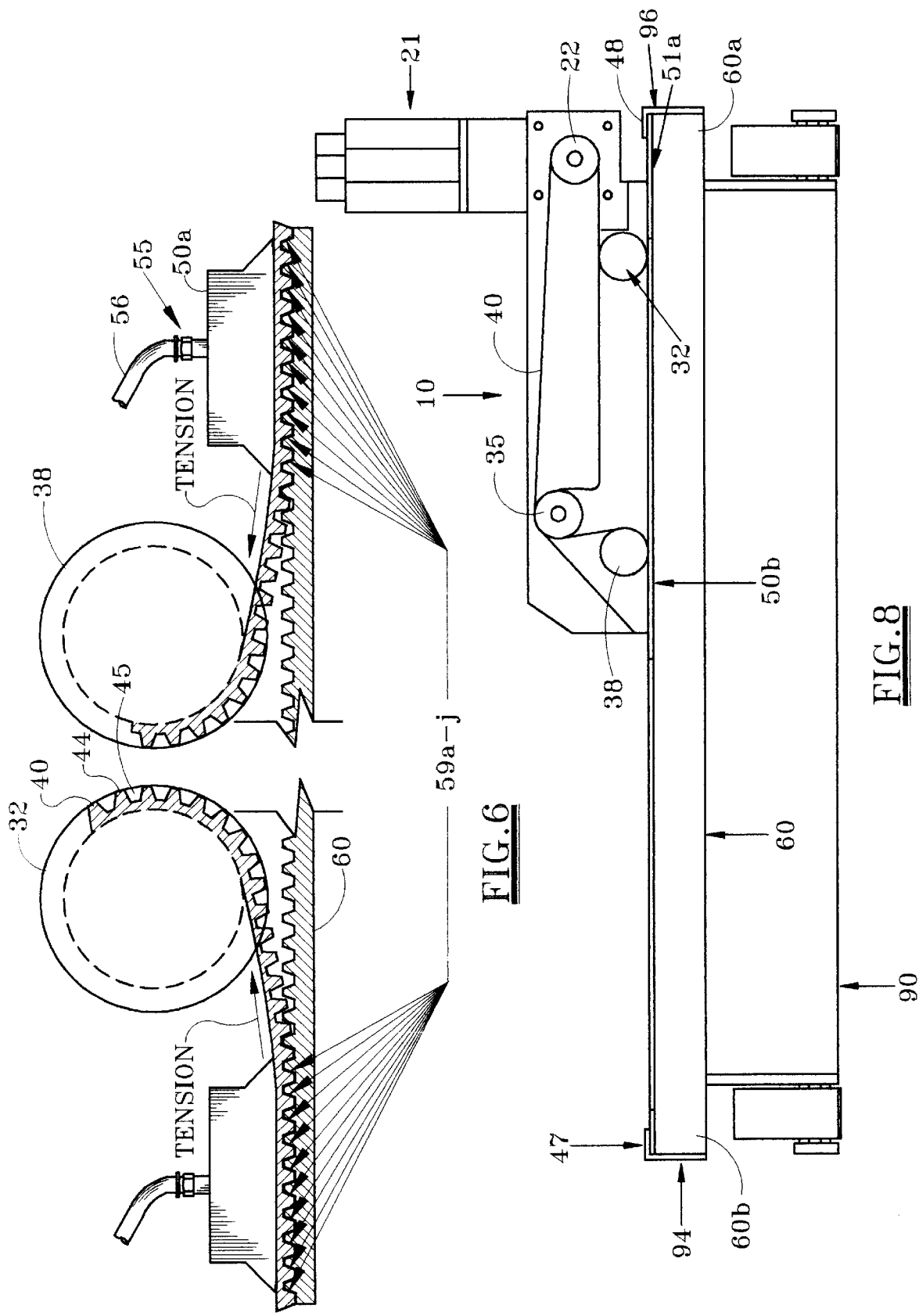

LINEAR DRIVE SYSTEM

BACKGROUND OF THE INVENTION

Linear drive systems often utilize belts to transfer torque from a rotary drive shaft to stationary objects to produce linear motion of the subject system. The commercial applications of linear drive systems are wide spread and encompass use of such systems in a variety of industrial machinery, vehicles, and more recently, robotics. When used in robotics applications, linear belt drive systems must respond proportionately and promptly to the rotary force supplied by the drive shaft. Robotics users rely on the fact that these systems will perform identical functions repeatedly. The nature of robotics systems requires displacement systems that are accurate, reliable and maintain their responsiveness under sudden accelerative or decelerative loads.

Requisite responsiveness involves identical linear displacements and velocity (or acceleration) to the rotational force being applied to the system by the drive motor. During periods of constant velocity most systems in use will adequately respond to the applied rotational force. However, during acceleration (acel) or deceleration (decel), current systems may experience uneven tensile load distributions in the belt. Uneven load distributions can produce localized stresses in the belt, thus causing discrete sections of it to elongate. If sections of the belt are being stretched, then a portion of the angular force supplied by the drive shaft is wasted on elongating the belt instead of linearly displacing the apparatus; this seriously hinders the responsiveness of the system.

Also, at some time in the operation, the stretched portion of the belt will return to its original length (the rubber band effect) and transfer the stored potential energy of the stretched portion onto the system. This produces an energy impulse to the system which may affect the linear accuracy of the system and also diminish system responsiveness. Therefore, increased responsiveness is achieved by distributing the tensile load along a shorter section of the belt. Absent belt elongation, linear motion of the system occurs in direct proportion to the drive shaft rotation —without unwanted impulses applied to the system. Other problems resulting from use of flexible belts in linear drive systems are backlash and belt wear. A significant cause of backlash is the difference in size between the belt teeth and rack grooves. It often occurs as a result of belt teeth shrinking in size during wear and moving or shifting within the groove.

Current linear belt drive systems address the problem of backlash and unwanted impulse to the system. Kuspert, in U.S. Pat. No. 4,753,119, discloses a drive for backlash-free conversion of rotary motion into linear motion. An endless, toothed belt engages with a toothed gear rack. The two sides of the drive gear are provided with arcuate guides which maintain the toothed belt in such engagement with the gear rack that a certain section accepts the load and only a short defined section of the toothed belt remains without engagement with a guide or counter teeth. Kuspert also discloses one short pressurizing means positioned between displacement rollers and disposed next to the toothed belt in the engagement area between the belt and a gear rack to press the teeth of the belt into the teeth of the gear rack. Kuspert suggests that contact rollers can be disposed against the rear side of the toothed belt for maintaining the belt against the gear rack. Another feature of Kuspert is the use of air nozzles to set up an air cushion and reduce the frictional effect. Also described are tooth profiles with small flange angles to reduce the lifting forces which tend to make the toothed belt rise out of the gear rack. The Kuspert device minimizes the free portion of the belt, i.e. the section that does not contact rollers, gears or drive sprockets. This limits the belt length, which increases belt tooth cycling. An increased cycling of the belt teeth may reduce belt life and system responsiveness.

Ragard, U.S. Pat. No. 4,938,087, discloses a zero backlash positioning system for a movable linear axis adaptable to electrical component handling equipment and similar robotics applications. The movable linear axis comprises a drive motor having a servomotor, a rack attached hingedly so as to be pivotal about a pivot axis, a speed reducer and a timing belt intermeshing with the rack so that forward and reverse rotation of the motor provides to and fro relative linear motion. Ragard '087 does not disclose the use of a belt.

Chittenden, U.S. Pat. No. 3,618,418, discloses a toothed driving belt system used for transmitting drive as a moving rack. An endless positive drive toothed belt has on at least one face a series of rack teeth, the belt being of such a degree of rigidity that, when used for transmitting drive as a moving rack from a driving pinion to a driven pinion, the length of the belt between driving and driven pinion members maintains a path dictated by the physical characteristics of the belt and the location of the members. Chittenden '418 does not address the problems of backlash, nor how they may avoided.

References providing general background interest consist of Fekete, et al., U.S. Pat. No. 3,001,651 which discloses a work transfer apparatus for transferring workpieces from one machine to another. This reference also claims a reciprocal toothed rack meshing with a pinion and a cam reciprocatingly engaging the rack. Mann, Jr., U.S. Pat. No. 4,481,005 discloses a chain drive system. Sallet, U.S. Pat. No. , 3,119,140 discloses a tape cleaning device using air flow and Boynton U.S. Pat. No. 822,503 discloses a means for cleaning driving belts of machinery using wiper blades.

There remains a need for a device that maintains a constant tensile load along a belt used in a belt drive system. In the disclosed references a single belt tooth bears the load that is transferred to the gear rack. It is desirable to have a linear drive system that evenly distributes the tensile load onto multiple teeth of the belt rather than concentrate the load on a single pressure point. It is also desirable to have a linear drive system that reduces localized belt strain or stretch caused by energy impulses from the acel and decel of the drive mechanism. Reduction of backlash is also a desired improvement in linear drive systems.

It is an objective of this invention to provide a linear drive system that is less vulnerable to backlash, beltstretch and the rubber band effect in belts, resulting in increased accuracy of the system and maximizing the responsiveness of the linear motion of the system relative to the angular force applied by the drive shaft. To achieve that objection, a feature of this invention is to provide two or more pressure pads in combination with a linear drive system for limiting tension to a specific section of the belt at any one time. The pressure pads provide a planar pressure source to even the load carried by the belt in the linear drive system by engaging multiple belt teeth with multiple rack grooves and maintaining tension on the belt to the area between the pressure pads.

A further feature of the invention is to provide alternate pressure pads comprised of a plurality of roller bearings encased in a rotating belt.

SUMMARY OF THE INVENTION

To achieve the foregoing features and advantages and in accordance with the purpose of the invention as embodied and broadly described herein, a linear drive system for translating rotary motion to linear motion is provided.

The linear drive system has a synchronous belt having belt teeth on at least one side. The belt teeth form belt grooves. The linear drive system further comprises a drive carriage that has a drive motor for generating a rotary force, a drive sprocket drivable by the drive motor for engaging with the synchronous belt, and at least two pressure pads in engagement with the synchronous belt. At least one tensioning roller tensions the synchronous belt and is positioned between the pressure pads. The drive carriage has an entrance point and an exit point. The linear rack further comprises a rigid rack aligned with the synchronous belt, the rack having gear teeth and rack grooves machined to mate with the belt grooves and belt teeth. The two pressure pads are mounted adjacent the synchronous belt so that one pressure pad is positioned proximate the entrance point of the drive carriage and a second pressure pad is positioned proximate the exit point of the drive carriage. In this way the pressure pads forcibly mate the belt teeth into the rack grooves as the belt enters or exits the drive carriage.

In a preferred embodiment, the synchronous belt is a linear belt in linear alignment with the rack, the belt has ends and the rack has ends and clamps so that the ends of the belt are clamped to the ends of the rack. Alternatively, the synchronous belt is a circular belt. The synchronous belt further comprises a tongue of raised teeth parallel to the longitudinal axis of the belt. The rack is a square tube having four sides, the toothed side of the rack defines a slot parallel to the longitudinal axis of the rack so that the tongue of the belt is press-fit into the slot of the rack when the belt is mated with the rack by the pressure pads.

In another preferred embodiment, the pressure pads comprise a compressed air knife system for propelling compressed air between the pressure pad and the belt to clean the belt of debris and reduce friction between the pressure pad and the belt. Preferably, the tensioning roller is a tensioning idler roller and the drive carriage has two or more fixed idler rollers positioned between the drive sprocket and the pressure pad.

In another embodiment, the linear drive system comprises a frame for structural support; synchronous belt having belt teeth on at least one side, the belt teeth forming belt grooves. The belt further comprises an elongated v-shaped tongue centered on the belt parallel to its longitudinal axis. In this embodiment, a drive carriage comprises a drive motor having a drive shaft for generating a rotary force, a drive sprocket to be driven by the drive shaft for engaging with the synchronous belt to translate the rotary force of the drive motor to a linear force on the belt, and at least one tensioning roller for tensioning the synchronous belt. The tensioning roller is attached to at least one support plate. One or more fixed idler rollers are parallel to the tensioning roller and the synchronous belt is in contact with the tensioning roller and the idler rollers. The drive carriage further comprises an entrance point and an exit point. A linear rail is connected to the support plate by bearing blocks. A rigid gear rack is aligned with the synchronous belt. The rack comprises a square tube having four sides, with one side of the rack having gear teeth and rack grooves machined to mate with the belt grooves and belt teeth. The linear rail is mounted within the rack and bolted to the frame. The toothed side of the rack further defines a slot parallel to the longitudinal axis of the rack so that the tongue of the belt is press-fit into the slot of the rack when the belt is mated with the rack. In this embodiment, at least two pressure pads are mounted above the synchronous belt so that one pressure pad is positioned proximate the entrance point of the drive carriage and a second pressure pad is positioned proximate the exit point of the drive carriage. In this way the pressure pads forcibly mate the belt teeth into the rack grooves as the belt enters or exits the drive carriage evenly distributing the linear force onto all the belt teeth under the pressure pads.

In a preferred embodiment of the linear drive system, the pressure pads further comprise air fittings and an air knife system is attached to the air fittings for propelling compressed air between pressure pads and the synchronous belt. Alternatively, the synchronous belt is a circular belt. Preferably, the pressure pads comprise top members and bottom members having plain bearings for sliding contact with the synchronous belt as the synchronous belt engages with the pressure pads. Alternatively, the pressure pads comprise a series of roller bearings bound by a bearing belt so that bearing belt engages with the synchronous belt to forcibly mate the belt teeth into the rack grooves. In another preferred linear drive system, the frame supports multiple drive carriages for movement of multiple payloads along a single synchronous belt on a common gear rack.

In another preferred linear drive system used for converting rotary motion to linear motion in gantry robots, the linear drive system comprises a frame for structural support; a linear synchronous belt having belt teeth on at least one side, the belt teeth forming belt grooves, the synchronous belt further comprising an elongated v-shaped tongue centered on the belt parallel to its longitudinal axis, a drive carriage having a drive motor mounted on the frame for generating a rotary force, the synchronous belt engaging with the drive motor to translate the rotary force to a linear force on the belt, at least one tensioning roller for tensioning the synchronous belt, one or more fixed idler rollers parallel to the tensioning roller, the synchronous belt in contact with the tensioning roller and the idler rollers, and the drive carriage further comprising an entrance point and an exit point. This preferred linear drive system further comprises a rigid gear rack in linear alignment with the synchronous belt, the rack having a square tube having four sides and one side of the rack having gear teeth and rack grooves machined to mate with the belt grooves and belt teeth. In this embodiment, the linear rail is mounted within the rack and bolted to the frame. The toothed side of the rack defines a slot parallel to the longitudinal axis of the rack so that the tongue of the belt is press-fit into the slot of the rack when the belt is mated with the rack. This preferred embodiment also has at least two pressure pads mounted above the synchronous belt on either side of the drive carriage so that the pressure pads forcibly mate the belt teeth into the rack grooves as the belt enters or exits the drive carriage evenly distributing the linear force onto all the belt teeth under the pressure pads. The pressure pads further comprise air fittings, and an air knife system attached to the air fittings for propelling compressed air between pressure pads and the synchronous belt.

In another preferred embodiment, the rigid rack and the linear rail mounted within the rack are connected to a support member for carrying a payload. Alternatively, the drive carriage can be connected to a support member for carrying a payload. Preferably, the pressure pads comprise a series of roller bearings bound by a bearing belt so that bearing belt engages with the synchronous belt to forcibly mate the belt teeth into the rack grooves. Alternatively, the pressure pads comprise top members and bottom members that comprise plain bearings for sliding contact with the synchronous belt as the synchronous belt engages with the pressure pads

BRIEF DESCRIPTION OF THE DRAWINGS

FIG. 2 is an enlarged view of a section of FIG. 1.

FIG. 3 is a transverse section of the linear drive system of FIG. 1 taken along lines A—A.

FIG. 5 is a enlarged view of a preferred embodiment of the pressure pad of this invention.

FIG. 6 is an enlarged view of partial sections of FIG. 1 illustrating a static situation in the linear drive system.

FIG. 8 is a cross-sectional view of an embodiment of the invention as used with a gantry robot.

DETAILED DESCRIPTION OF THE INVENTION

Figure 1:
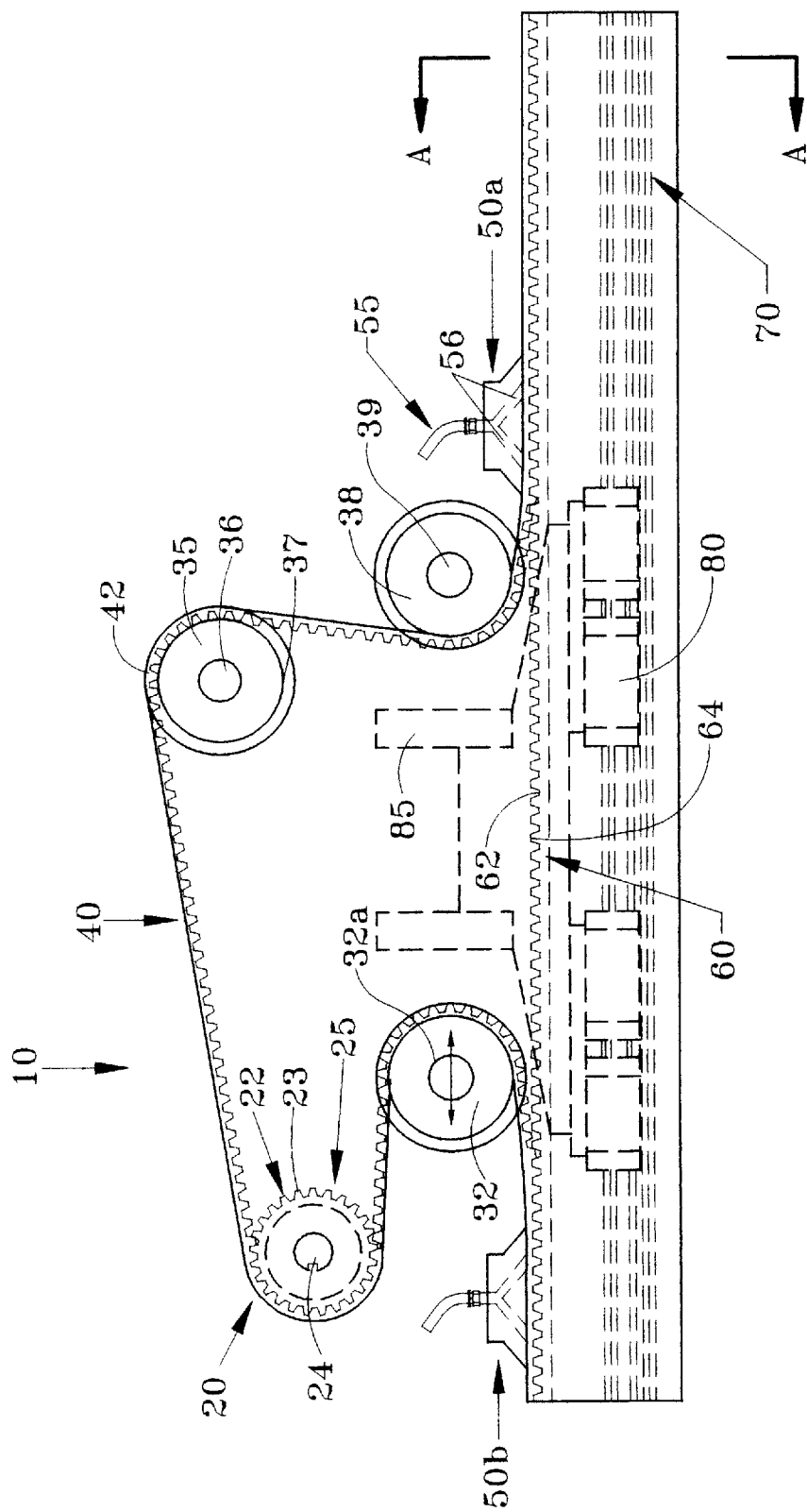
FIG. 1 is a cross-sectional view of a linear drive system according to one embodiment of the present invention.

Referring now to the drawings in which like parts are referenced by like numerals, the linear drive system 10 of this invention translates rotary motion of a drive motor 21 to linear motion on a gear rack 60 by the use of a synchronous belt 40. Multiple pressure pads 50a, 50b located on either side of a drive carriage 20 are used to mesh the belt 40 onto the rack 60. The belt 40 is tensioned in a section between the pressure pads 50a, 50b resulting in even tensile load distribution thereby reducing belt stretch. The section of the belt 40 subject to stretch is limited to the area between the pressure pads 50a, 60b. By having the load bearing section of the belt 40 transferred to the gear rack 60 in the area under the two pressure pads 50a, 50b on either side of a drive carriage 20, energy impulses on the system 10 or backlash are practically eliminated. Backlash is reduced by using tensioning roller 32 to tension the multiple belt teeth 44 against the grooves of the rack 62. Reduction of belt stretch and backlash improves the accuracy and reliability of linear displacement of the work product.

FIG. 1 illustrates a cross-section of one embodiment of the linear drive system in which rotary force produced by a drive motor 21 (shown in FIG. 8) rotates a drive shaft 24 attached to a drive sprocket 22 transferring the rotary force to the drive sprocket 22. Teeth 23 and grooves 25 on the drive sprocket 22 interlock with grooves 45 and teeth 44 on a flexible, synchronous belt 40 so that the rotary force produced by the drive motor 21 is exerted on the synchronous belt 40. The drive carriage 20 includes at least one tensioning roller 32 and one or more idler rollers 35, preferably a first idler roller 35 and a second idler roller 38, parallel to and in alignment with the drive shaft 24. The synchronous belt 40 travels along a path within the drive carriage 20 guided by the tensioning roller 32 and the idler rollers 35, 38. The synchronous belt travels over outer surface 37 of idle roller 35. The tensioning roller 32 and the idler rollers 35, 38 bend and support the flexible synchronous belt 40 as it travels off the drive sprocket 22, through the drive carriage 20 and onto a rigid, linear gear rack 60.

As illustrated in FIG. 3, the synchronous belt 40 is preferably a selftracking belt 40. A section in the center of the self-tracking belt 40 forms an elongated, V-shaped tongue 46. Grooves 38a (illustrated only on the second idler roller 38) circumscribe the drive sprocket 22, the tensioning roller 32 and the idler rollers 35, 38 so that the tongue 46 of the synchronous belt 40 engages with the grooves 38a as the belt 40 travels through the carriage 20 thereby guiding the belt 40 along a defined path.

Referring to FIG. 1, pressure pads 50a, 50b, located on either side of the drive carriage 20, mesh the belt grooves 45 and belt teeth 44 with the gear teeth 64 and rack grooves 62 of the gear rack 60 so that the force is distributed evenly on the belt teeth 44 under the area of the pressure pads 50a, 50b. Multiple teeth 44 share the load on the synchronous belt 40 reducing wear on the belt 40. The force or load on the belt 40 is transferred to the linear rack 60 thereby producing linear motion. Optimum linear motion is obtained by transmitting all of the rotary forces produced by the drive motor 21 to the linear rack 60 by means of the synchronous belt 40. Since the synchronous belt 40 is flexible, the belt 40 must be under tension so that the load on the belt 40 is not lost to backlash, belt flapping or the rubber band effect as the starts and stops of the drive motor 21 produce acel and decel forces that travel the length of the belt 40 between the pressure pads 50a, 50b. The amount of stretch in the belt 40 is proportionately decreased depending on the length of the belt 40 under tension. The pressure pads 50a, 50b confine the acel and decel forces traveling along the length of the belt to the area between the pressure pads 50a, 50b since these forces are transmitted to the gear rack 60 as the belt 40 passes under the pressure pads 50a, 50b and the synchronous belt 40 is meshed with the gear rack 60. Because the section of the belt 40 under load is limited to the section between the pressure pads 50a, 50b, belt stretch or the rubber band effect is reduced therefore reducing the loss of linear force Within the drive carriage, the synchronous belt 40 loops around a tensioning roller 32. The tensioning roller 32 has a tensioning adjustment screw for moving the tensioning roller 32 in a linear motion parallel to the rack 60. The adjustment of the tensioning roller 32 removes backlash between the belt 40 and the rack 60 within the drive carriage 20 and maintains the tension in the belt 40. Accuracy in positioning of a work load, especially in robot systems, depends on accurate positioning of support members to lift, move or manipulate objects and is greatly improved by inhibiting belt stretching and the rubber band effect.

FIG. 6 is a static view of a section of the linear drive system 10 to illustrate the relationship between the tensioning roller 32, the synchronous belt 40 and the pressure pads 50a, 50b. In FIG. 6, it is assumed that no acel or decel forces are exerted onto the belt 40. The pressure pads 50a, 50b allow for multiple belt/rack contact points 59 a—j as multiple belt teeth 44 are meshed with multiple rack grooves 62. In this way belt forces are distributed evenly among the teeth 44 underneath the pressure pad lessening wear on the belt 40. As the tensioning roller 32 is moved in a direction away from a pressure pad 50a, it pulls the synchronous belt 40 in that same direction against the rack teeth 64 thereby tensioning the belt 40 against the fixed rack 60 and further reducing backlash.

As shown in FIG. 3, the gear rack 60 is preferably a square tube having four sides. One side 61 of the rack 60 (the side machined with gear teeth 64 and grooves 62) defines a slot 65 that runs parallel to the longitudinal axis of the rack 60. When the synchronous belt 40 travels under the pressure pads 50a, 50b, the tongue 46 of the belt 40 is press-fit into the slot 65 of the rack 60 as the belt 40 mates with the rack 60. A linear rail 70 is mounted within the gear rack 60 to provide a bearing surface for the linear drive system 10. The gear rack 60 is bolted to the linear rail 70 and both the gear rack 60 and linear rail 70 are bolted to a structural support frame 90.

Figure 4:
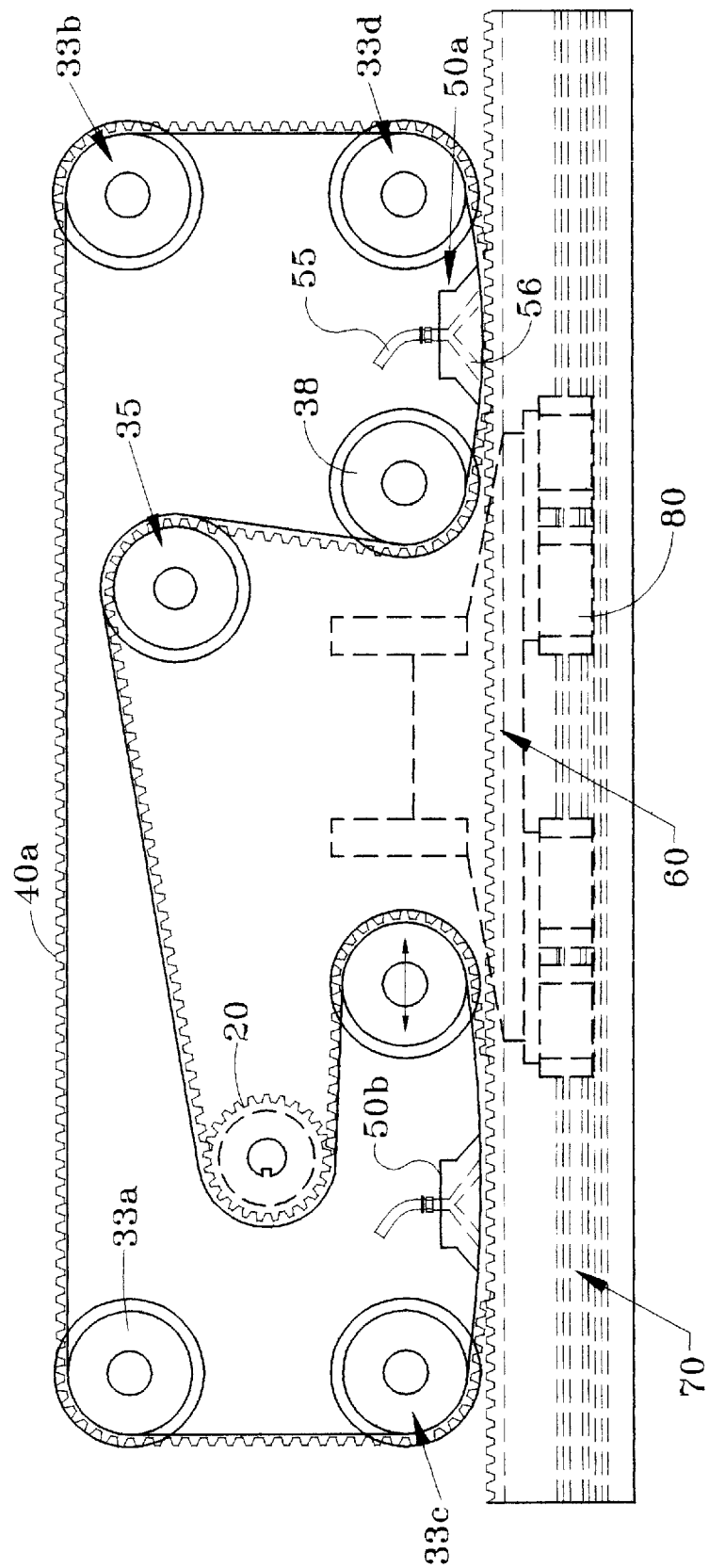
FIG. 4 is a cross-sectional view of a linear drive system employing a circular or endless belt.

Preferably, the drive carriage 20 is in linear alignment with and above the gear rack 60 as shown in FIG. 1. Alternatively, the drive carriage 20 may be below or on either side of the rack 60. The synchronous belt 40 is preferably a linear belt 40 attached to the frame 90. The ends 47, 48 of the synchronous belt 40 are attached to rack ends 60a, 60b by clamps 94, 96 bolted onto the rack ends 60a, 60b. In an alternative embodiment, as illustrated in FIG. 4, the synchronous belt 40 is an endless, circular belt 40a wherein the synchronous belt 40a loops above and around additional idler rollers 33a, 33b, 33c and 33d in the drive carriage 20 upon leaving the pressure pads 50a, 50b. In this embodiment of the invention as in the previous embodiment, the amount of circular belt 40a under tension is limited to the section of the belt under the pressure pads 50a, 50b.

Referring to FIG. 1 and FIG. 3, in a preferred embodiment, the tensioning roller 32, and the idler rollers 35, 38 and 39 revolve around shafts, 32a, 36 and 39 respectively, that are bolted to a support system (not shown). The support system is bolted to a support plate 85 that is fitted into the rack slot 65 in the area between the tensioning roller 32 and the idler roller 38. This support plate 85 is then bolted to one or more bearing blocks or trolleys 80. The bearing blocks 80 ride the linear rail 70. In this manner the linear rail 70 bears the load of the drive carriage 20. Preferably, four bearing blocks 80 are used to transfer the load to the linear rail 70.

The drive motors 21 used to provide the rotary force of the invention are known in the art. Examples of alternative drive motors are an AC synchronous drive, a DC stepper motor and a servomotor. Preferably, the drive motor 21 is a brushless AC servomotor. In the preferred embodiment of the linear drive system 10, the rigid linear gear rack 60 is a custom extrusion rack 60 comprised of a square tube 60 as seen in FIG. 3. Preferably the square tube is a 3 inch square having 3/8 inch wall and is extruded from aluminum. Gear teeth 64 and grooves 62 are machined on one side of the rack 61 to precisely match the grooves 45 and teeth 44 of the synchronous belt 40. The toothed side of the rack 61 defines a slot 65 that runs parallel to the longitudinal axis of the rack 60. The linear rail 70 may be comprised from any strong support metal, preferably steel. Although bolting is the preferred method of attachment of the various members of the linear drive system 10 to various support members and the frame 90, any method of attachment capable of bearing the loads exerted on the system 10 may be utilized.

FIG. 1 and FIG. 2 illustrate a preferred embodiment of the pressure pads 50a, 50b. As illustrated, the pressure pads 50a, 50b are plain bearings that are in sliding contact across the backside of the synchronous belt 42. Preferably, the pressure pads 50a, 50b are made from ultra high molecular weigh polymers, most preferably polyethylene although other materials having a low coefficient of friction may be used. Referring to FIG. 3, preferably an air knife system 55 is used to introduce compressed air into air fittings 56 in the pressure pad 50a. The compressed air serves two purposes. The first is to provide an air cushion to reduce the friction between the pressure pad 50a and the backside of the synchronous belt 42. Compressed air also serves to clean the backside of the belt 42 and the rack of dust and debris. In another preferred embodiment of the pressure pads 51a, 51b as illustrated in FIG. 5, the pressure pad 51a is comprised of a series of roller bearings 52 bound by a bearing belt 53. The bearing belt 53 engages with the backside of the synchronous belt 42 to forcibly mate the belt teeth 44 with the rack grooves 62. An air knife system 55 may also be used with this embodiment of the pressure pad.

The synchronous belt 40 may be constructed in various formations known in the art such as a single-ply fabric belt, a multiple ply fabric belt or a rayon cord belt. The preferred belt has steel cable tension members encased in flexible polymers. Another preferred belt is comprised of KEVLAR type cords, a trademarked product known to those in the art.

Preferably, the rack grooves 62 are machined to match the belt teeth 44. A preferred synchronous belt 40 is a linear belt 40 in alignment with the linear rack 60. Alternatively, as shown in FIG. 4, the synchronous belt 40 is an endless circular belt 40a that moves along the linear rack 60. Belts 40, 40a of this system 10 vary in length and may be relatively short, one to four feet, if the synchronous belt is a circular belt 40a or as long as 500 feet or more if a linear belt is used for positioning work loads along large distances. The linear synchronous belt 40 also acts as a dust cover for the rack and the clamps 94, 96 (FIG. 8) which attach the belt 40 to the rack 60 also prevent dust and debris from entering through the open ends of the rack 60a, 60b.

Figure 7:
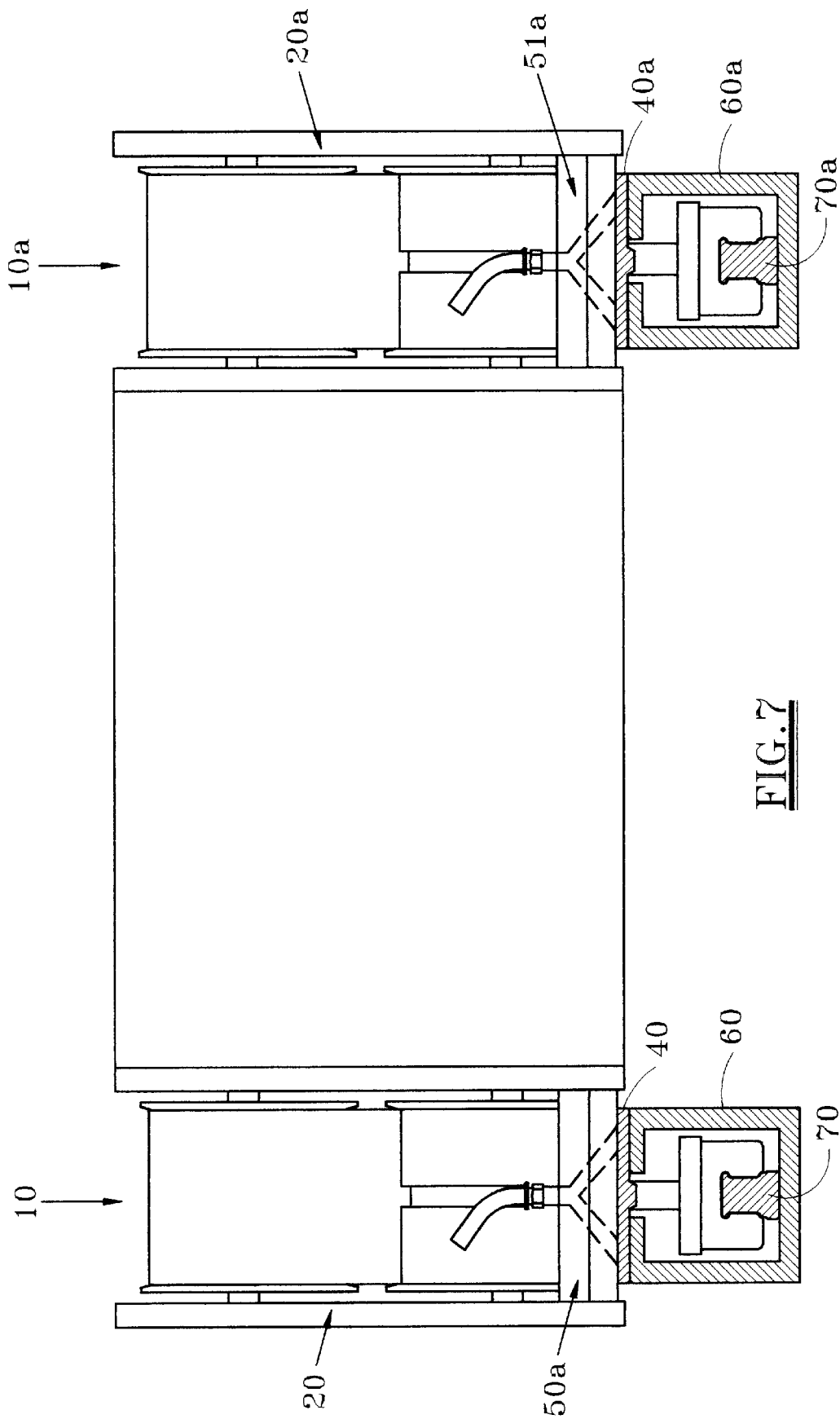
FIG. 7 is a transverse section of a linear drive system according another embodiment of this invention illustrating multiple parallel linear drive systems.

In one embodiment of the linear drive system 10, the drive carriage 20 is movable and the rack 60 is stationary so that the linear motion occurs as the carriage moves along the linear rail 70. Support members are bolted or otherwise attached to the drive carriage 20 which move a payload (not shown). Alternatively, the rack 60 is movable and the drive carriage 20 is stationary. In this embodiment, support members are bolted to the rack 60 and linear rail 70 so that the rack 60 and linear rail 70 move a payload. As illustrated in FIG. 7, multiple linear drive systems 10, 10a having multiple carriages 20, 20a, pressure pads 50a, 51a, racks 60, 60a, linear rails 70, 70a and synchronous belts 40, 40a that are used in parallel alignment to move a payload or alternatively, multiple payloads. Alternatively, one linear drive system 10 is used as the payload for a second linear drive system 10a whose axis is perpendicular to the first linear drive system.

In one preferred embodiment of the linear drive system 10, the system is used to power a gantry robot. In a gantry robot, multiple linear drive systems 10 are used on two or more axes, for example, x axis, y axis or z axis, Cartesian coordinates that are mutually perpendicular. Each linear drive system 10 creates movement along one axis. The three linear drive systems used in concert results in movement of a payload in three dimensions, horizontal, vertical and side to side. Backlash and belt stretching result in variations in the positioning of the support members and therefore inaccuracies in the movement and manipulation of the payload. Accurate positioning is achieved by the dual pressure pads 50a, 50b that reduce the section of the belt 40 subject to stretch and by the tensioning system of the present invention that reduces backlash.

The foregoing description is illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

I claim:

1. A linear drive system, comprising:
    a synchronous belt having belt teeth on at least one side, the belt teeth forming belt grooves;
    a drive carriage comprising a drive motor for generating a rotary force, a drive sprocket drivable by the drive motor for engaging with the synchronous belt, at least two pressure pads in engagement with the synchronous belt, the pressure pads comprising elongated members in contact with more than one point on the synchronous belt, at least one tensioning roller for tensioning the synchronous belt, the tensioning roller positioned between the pressure pads, the drive carriage further comprising an entrance point and an exit point; and
    a rigid rack aligned with the synchronous belt, the rack having gear teeth and rack grooves machined to mate with the belt grooves and belt teeth, the two pressure pads mounted adjacent the synchronous belt wherein one pressure pad is positioned proximate the entrance point of the drive carriage and a second pressure pad is positioned proximate the exit point of the drive carriage so that the pressure pads forcibly mate the belt teeth into the rack grooves as the belt enters or exits the drive carriage.

2. The linear drive system of claim 1 wherein the synchronous belt is a linear belt in linear alignment with the rack, the belt having ends and the rack having ends wherein the ends of the belt are clamped to the ends of the rack.

3. The linear drive system of claim 1 wherein the synchronous belt is a circular belt.

4. The linear drive system of claim 1 wherein the synchronous belt further comprises a tongue of raised teeth parallel to the longitudinal axis of the belt.

5. The linear drive system of claim 1 wherein the rack is a square tube having four sides, including a toothed side of the rack defining a slot parallel to the longitudinal axis of the rack so that the tongue of the belt is press-fit into the slot of the rack when the belt is mated with the rack by the pressure pads.

6. The linear drive system of claim 1 comprising a compressed air knife system for propelling compressed air between the pressure pad and the belt to clean the belt of debris and reduce friction between the pressure pad and the belt.

7. The linear drive system of claim 1 wherein the tensioning roller is a tensioning idler roller and two or more fixed idler rollers are positioned between the drive sprocket and the pressure pad.

8. A linear drive system, comprising:

a frame for structural support;

a synchronous belt having belt teeth on at least one side, the belt teeth forming belt grooves, the belt further comprising an elongated V-shaped tongue centered on the belt parallel to its longitudinal axis;

a drive carriage comprising a drive motor having a drive shaft for generating a rotary force, a drive sprocket to be driven by the drive shaft for engaging with the synchronous belt to translate the rotary force of the drive motor to a linear force on the belt, at least one tensioning roller for tensioning the synchronous belt, the tensioning roller attached to at least one support plate, one or more fixed idler rollers parallel to the tensioning roller, the synchronous belt in contact with the tensioning roller and the idler rollers, and the drive carriage further comprising an entrance point and an exit point;

a linear rail connected to the support plate by bearing blocks;

a rigid gear rack aligned with the synchronous belt, the rack comprising a square tube having four sides, one side of the rack having gear teeth and rack grooves machined to mate with the belt grooves and belt teeth, the linear rail mounted within the rack and bolted to the frame, the toothed side of the rack further defining a slot parallel to the longitudinal axis of the rack so that the tongue of the belt is press-fit into the slot of the rack when the belt is mated with the rack;

at least two pressure pads mounted above the synchronous belt wherein one pressure pad is positioned proximate the entrance point of the drive carriage and a second pressure pad is positioned proximate the exit point of the drive carriage so that the pressure pads forcibly mate the belt teeth into the rack grooves as the belt enters or exits the drive carriage thereby transferring the linear force to the rack and evenly distributing the linear force onto all the belt teeth under the pressure pads.

9. The linear drive system of claim 8 wherein the pressure pads further comprise air fittings; an air knife system is attached to the air fittings for propelling compressed air between pressure pads and the synchronous belt.

10. The linear drive system of claim 8 wherein the synchronous belt is a circular belt.

11. The linear drive system of claim 8 wherein the pressure pads comprise top members and a bottom members, the bottom members comprising plain bearings for sliding contact with the synchronous belt as the synchronous belt engages with the pressure pads.

12. The linear drive system of claim 8 wherein the pressure pads comprise a series of roller bearings bound by a bearing belt so that bearing belt engages with the synchronous belt to forcibly mate the belt teeth into the rack grooves.

13. The linear drive system of claim 8 wherein the frame supports multiple drive carriages for movement of multiple payloads along a single synchronous belt on a common gear rack.

14. A linear drive system for converting rotary motion to linear motion in gantry robots comprising:

a frame for structural support;

a linear synchronous belt having belt teeth on at least one side, the belt teeth forming belt grooves, the synchronous belt further comprising an elongated v-shaped tongue centered on the belt parallel to its longitudinal axis;

a drive carriage having a drive motor mounted on the frame for generating a rotary force, the synchronous belt engaging with the drive motor to translate the rotary force to a linear force on the belt, at least one tensioning roller for tensioning the synchronous belt, one or more fixed idler rollers parallel to the tensioning roller, the synchronous belt in contact with the tensioning roller and the idler rollers, and the drive carriage further comprising an entrance point and an exit point;

a rigid gear rack in linear alignment with the synchronous belt, the rack comprising a square tube having four sides, one side of the rack having gear teeth and rack grooves machined to mate with the belt grooves and belt teeth; the linear rail mounted within the rack and bolted to the frame, the toothed side of the rack defining a slot parallel to the longitudinal axis of the rack so that the tongue of the belt is press-fit into the slot of the rack when the belt is mated with the rack;

at least two pressure pads mounted above the synchronous belt on either side of the drive carriage wherein the pressure pads forcibly mate the belt teeth into the rack grooves as the belt enters or exits the drive carriage evenly distributing the linear force onto all the belt teeth under the pressure pads, the pressure pads further comprising air fittings, and an air knife system attached to the air fittings for propelling compressed air between pressure pads and the synchronous belt.

15. The linear drive system of claim 14 wherein the rigid rack and the linear rail mounted within the rack are connected to a support member for carrying a payload.

16. The linear drive system of claim 14 wherein the drive carriage is connected to a support member for carrying a payload.

17. The linear drive system of claim 14 wherein the pressure pads comprise a series of roller bearings bound by a bearing belt so that bearing belt engages with the synchronous belt to forcibly mate the belt teeth into the rack grooves.

18. The linear drive system of claim 14 wherein the pressure pads comprise top members and bottom members, the bottom members comprising plain bearings for sliding contact with the synchronous belt as the synchronous belt engages with the pressure pads.

* * * * *